(12) United States Patent
Savic et al.

(10) Patent No.: US 10,091,295 B1
(45) Date of Patent: Oct. 2, 2018

(54) CONVERGED INFRASTRUCTURE IMPLEMENTED WITH DISTRIBUTED COMPUTE ELEMENTS

(71) Applicant: EMC Corporation, Hopkinton, MA (US)

(72) Inventors: Dragan Savic, Brookline, MA (US); Stephen Todd, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 268 days.

(21) Appl. No.: 14/862,855

(22) Filed: Sep. 23, 2015

(51) Int. Cl.
*H04L 29/08* (2006.01)
*G06F 9/50* (2006.01)
*G06F 17/30* (2006.01)

(52) U.S. Cl.
CPC ............ *H04L 67/1097* (2013.01); *G06F 9/50* (2013.01); *G06F 17/302* (2013.01); *H04L 67/1002* (2013.01); *G06F 2212/7207* (2013.01)

(58) Field of Classification Search
CPC ............. H04L 41/0803; H04L 41/0813; H04L 41/0823; H04L 67/1097; G06F 15/16; G06F 9/50; G06F 17/302; G06F 2212/7207
See application file for complete search history.

(56) References Cited

U.S. PATENT DOCUMENTS 9,521,198 B1 * 12/2016 Agarwala ........... G06F 12/0253
9,575,689 B2 * 2/2017 Savic .................... G06F 3/0659
2005/0281280 A1 12/2005 Zur et al.
2013/0089089 A1 4/2013 Kamath et al.
2013/0108263 A1 5/2013 Srinivas et al.
2013/0163607 A1 6/2013 Shukla et al.
2013/0246650 A1 * 9/2013 Tsuboki ............... H04L 67/1097
709/236
2013/0329743 A1 12/2013 Gai et al.
2014/0059295 A1 2/2014 Northcutt et al.
2014/0068032 A1 * 3/2014 Kannan ............... H04L 12/4641
709/221
2014/0115137 A1 4/2014 Keisam
2014/0198686 A1 7/2014 Kamble et al.
(Continued)

*Primary Examiner* — Jeong S Park
(74) *Attorney, Agent, or Firm* — Ryan, Mason & Lewis, LLP

(57) ABSTRACT

Systems, methods, and articles of manufacture comprising processor-readable storage media are provided for implementing converged infrastructure systems with computing elements distributed over server nodes, network nodes, and storage media nodes. For example, a computing system includes application server nodes, network switch nodes, and storage media nodes. The storage media nodes include persistent storage elements to store data. The network switch nodes are configured to enable communication between the application server nodes and the storage media nodes, and to enable communication between the storage media nodes. The application server, network switch, and storage media nodes are configured to implement a converged infrastructure, wherein the converged infrastructure includes compute elements distributed over the application server, network switch, and storage media nodes. The distributed compute elements are configured to collaboratively control and coordinate data processing functions within the converged infrastructure.

20 Claims, 9 Drawing Sheets

(56) References Cited

U.S. PATENT DOCUMENTS

| | | |
|---|---|---|
| 2014/0254607 A1 | 9/2014 | Anantharam et al. |
| 2014/0280489 A1* | 9/2014 | Nandyalem ............ H04L 67/42 |
| | | 709/203 |
| 2014/0280827 A1 | 9/2014 | Kamble et al. |
| 2014/0280841 A1 | 9/2014 | Kamble et al. |
| 2014/0307556 A1 | 10/2014 | Zhang |
| 2014/0337391 A1 | 11/2014 | Starovoitov et al. |
| 2014/0365622 A1 | 12/2014 | Iyengar et al. |
| 2014/0379928 A1 | 12/2014 | Song et al. |
| 2015/0067212 A1 | 3/2015 | Talla |
| 2015/0071053 A1 | 3/2015 | Kempf et al. |
| 2015/0092593 A1 | 4/2015 | Kompella |
| 2015/0113038 A1 | 4/2015 | Fedders et al. |
| 2015/0172117 A1* | 6/2015 | Dolinsky ............ H04L 41/0803 |
| | | 709/221 |
| 2015/0237137 A1* | 8/2015 | Dageville ............ G06F 9/5016 |
| | | 709/213 |
| 2016/0314025 A1* | 10/2016 | McGarry ................ G06F 9/542 |

\* cited by examiner

CONVERGED INFRASTRUCTURE IMPLEMENTED WITH DISTRIBUTED COMPUTE ELEMENTS

FIELD

The field relates generally to computing systems and, in particular, to implementing converged infrastructure computing systems.

BACKGROUND

Traditional data centers are designed with computing frameworks that provide a distinct separation between application servers, network nodes, and storage nodes. For example, front end application servers of a data center typically have at least two adapters, including, for example, an Ethernet NIC (Network Interface Card) to connect to a computer network (e.g., Ethernet-based Local Area Network), as well as an FC HBA (Fiber Channel Host Bus Adapter) card to connect to a storage network, such as a SAN (storage area network). Moreover, storage nodes of the data center typically implement HBA cards, wherein the application servers and storage nodes utilize the HBA cards to communicate over a storage communications network implemented using Fiber Channel-based network switches. Moreover, in conventional data center designs, the storage nodes implement fabric cards that are configured to enable communication between the storage nodes using an internal fabric backplane having fabric switches, which is separate from the network switches of the storage area network.

While CI (Converged Infrastructure) and other unified computing frameworks have been developed to group multiple IT (Information Technology) components into a single, optimized package, the primary purpose of such conventional computing frameworks is to consolidate systems, centralize IT management, and reduce TCO (total cost of ownership). However, these conventional designs are not flexible with regard to scale-out of storage nodes or application servers. For example, the addition of new application servers into the computing system can result in an increased processing load on the back end storage nodes, requiring the addition of a new storage node. Such scaling results in "coarse-grained" scaling of the storage nodes and places limits on scaling flexibility.

SUMMARY

Illustrative embodiments include techniques for implementing converged infrastructure systems with distributed computing elements. For example, one embodiment includes a computing system having a plurality of application server nodes, network switch nodes, and storage media nodes. The storage media nodes include persistent storage elements to store data. The network switch nodes are configured to enable communication between the application server nodes and the storage media nodes, and to enable communication between the storage media nodes. The application server nodes, network switch nodes, and storage media nodes are configured to implement a converged infrastructure, wherein the converged infrastructure includes compute elements distributed over the application server nodes, the network switch nodes, and the storage media nodes. The distributed compute elements are configured to collaboratively control and coordinate data processing functions within the converged infrastructure. For example, in one embodiment, the data processing functions include data storage functions and other related functions for storing data to, and accessing data from, one or more persistent storage elements of the storage media nodes.

Other embodiments of the invention include, without limitation, methods and articles of manufacture comprising processor-readable storage media.

DETAILED DESCRIPTION

Figure 1:
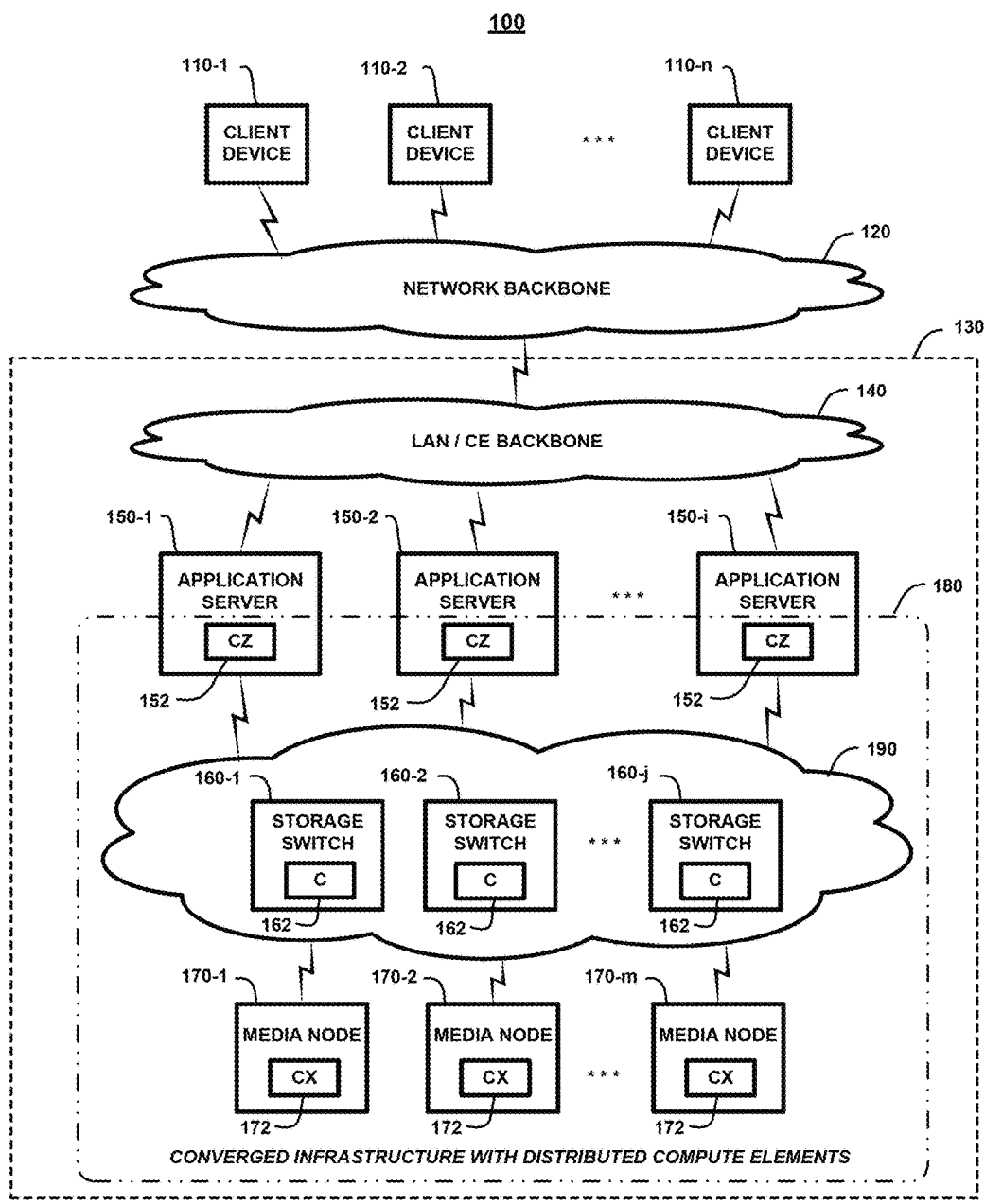
FIG. 1 schematically illustrates a computing system having a converged infrastructure that is implemented using distributed compute elements, according to an embodiment of the invention.

Illustrative embodiments will now be described in further detail with regard to techniques for implementing converged infrastructure systems with computing elements distributed over server nodes, network nodes, and storage media nodes. Embodiments described herein include, for example, extensible data storage architectures that are implemented using an extensible converged infrastructure architecture in which storage functions are distributed across server nodes, network nodes, and storage media nodes to provide an efficient, high performance, scalable computing solution. The storage functions are executed using a plurality of distributed compute elements that reside on the server nodes, network nodes, and storage media nodes, wherein the distributed compute elements are configured to collaboratively control and coordinate data storage functions and other associated functions within the converged infrastructure such as data and metadata processing, transferring and storing of data, and management and orchestration services to control placement and dynamic application workload.

It is to be understood that the term "computing system" as used herein is intended to be broadly construed, so as to encompass, for example, any system comprising multiple networked processing devices such as a data center or any private or public cloud computing system or enterprise network. Moreover, the term "data storage system" as used herein is intended to be broadly construed, so as to encompass, for example, any type of data storage system, or combination of data storage systems, including, but not limited to storage area network (SAN) systems, network attached storage (NAS) systems, Hadoop Distributed File System (HDFS), as well as other types of data storage systems comprising clustered or distributed virtual and/or physical infrastructure.

The term "compute element" is further intended to include any computing resource that performs data processing functions based on software, hardware, firmware, etc. For example, a "compute element" as used herein is intended to be broadly construed, so as to encompass all types of processors including, for example, (i) general purpose processors which comprise "performance cores" (e.g., low latency cores), and (ii) workload-optimized processors, which comprise any possible combination of multiple "throughput cores" and/or multiple hardware-based accelerators (e.g., protocol termination, cryptographic, compression, de-duplication, RAID, etc.). Examples of workload-optimized processors include, for example, graphics processing units (GPUs), digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient, than is possible for executing such functions in software running on a more general purpose processor.

Furthermore, the term "control plane" as used herein refers to a set of control functions that are executed to control the flow of data through a data storage system, for example, the "signaling" of the system. Moreover, the term "data plane" as used herein (also referred to as the "forwarding plane") refers to a processing path that data takes as the data flows through the data storage system (e.g., a sequence of data processing functions performed on data that is received from a network entity and stored in a data storage system, or a sequence of data processing functions performed on data that is accessed from the data storage system and transmitted to some network entity requesting the data).

FIG. 1 schematically illustrates a computing system having a converged infrastructure that is implemented using distributed compute elements, according to an embodiment of the invention. In particular, FIG. 1 schematically illustrates a computing network 100 comprising a plurality of client devices 110-1, 110-2, . . . , 110-n (collectively referred to as client devices 110), a network 120, and a computing system 130. The computing system 130 comprises a LAN (local area network) 140, a plurality of application server nodes 150-1, 150-2, . . . , 150-i (collectively referred to as application servers 150), a plurality of network switch nodes 160-1, 160-2, . . . , 160-j (collectively referred to as network switches 160), and a plurality of storage media nodes 170-1, 170-2, . . . , 170-m (collectively referred to as storage media nodes 170). As explained in further detail below, the application server nodes 150, the network switch nodes 160, and the storage media nodes 170 are configured to implement a converged infrastructure 180 with distributed compute elements (CZ, C, CX).

The client devices 110 may comprise, for example, desktop computers, laptop computers, PDAs (personal digital assistants), smart phones, electronic tablets, or other types of computing devices that enable users and other entities to access the computing system 130 via the network 120. The network 120 may comprise, for example, a global computer network such as the Internet, a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, the network 120 in some embodiments therefore comprises combinations of multiple different types of communications networks each comprising network devices configured to communicate using Internet Protocol (IP) or other related communication protocols. The network 120 comprises intermediate points (such as routers, switches, etc.) and other elements that form a network backbone to establish communication paths and enable communication between network endpoints.

In one embodiment, the computing system 130 performs data processing and storage functions to support one or more network applications and/or on-line services that are associated with private or public entities. In particular, the application servers 150 of the computing system 130 are configured to host and manage one or more applications, which are used by multiple, simultaneously connected users and/or entities. Depending on the implementation of the computing system 130, the application servers 150 are configured to, e.g., execute business logic, execute scripts and services to query databases, and perform other computing functions that are needed to host and deliver network applications and services to multiple end users, service providers, and/or organizations. In one embodiment of the invention, the computing system 130 is implemented using a cluster of servers which reside in a single facility (e.g., data center facility of a private company) or a cluster of servers which reside in two or more data center facilities or which are distributed over remote locations (e.g., distributed over a cloud network) of a given service provider, for example.

The LAN 140 is configured as a front-end network that enables client access to the application servers 150. In one embodiment of the invention, the LAN 140 is implemented using a converged Ethernet networking protocol. The network switch nodes 160 are configured to implement a communications network 190 (e.g., a CE (converged Ethernet) communications network). The network switch nodes 160 are configured to enable communication over the communications network 190 between the application server nodes 150 and the storage media nodes 170, and between the storage media nodes 170.

The storage media nodes 170 include persistent storage elements to store data, as well as control circuitry that is configured to control data access operations for storing or accessing data to and from one or more persistent storage elements that are associated with the storage media nodes 170. The persistent storage elements can be implemented using one or more different types of persistent storage devices such as HDDs (hard disk drives), flash storage devices, disk storage devices, SSD (solid state drive) devices, or other types and combinations of non-volatile memory. The storage media nodes 170 are configured as a storage network to provide a centralized repository for data that can be stored and accessed by the application servers 150. The storage media nodes 170 collectively provide a pool of storage resources which can be utilized by the application servers 150.

In the embodiment of FIG. 1, the application server nodes 150, the network switch nodes 160, and the storage media nodes 170 are configured to implement a converged infrastructure 180 with distributed compute elements. In particular, the converged infrastructure 180 comprises a plurality of compute elements 152/162/172 which are distributed over the application server nodes 150, the network switch nodes 160, and the storage media nodes 170, respectively. As depicted in FIG. 1, the application server nodes 150 comprise compute elements 152 (denoted CZ), the storage switch nodes 160 comprise compute elements 162 (denoted C), and the storage media nodes 170 comprise compute elements 172 (denoted CX).

The distributed compute elements 152, 162, and 172 are configured to collaboratively control and coordinate data processing functions and network interface functions within the converged infrastructure 180. These data processing functions will vary depending on the application. For example, in one embodiment of the invention as discussed in further detail below with reference to FIGS. 2 and 3, the data processing functions comprise data storage functions (control plane functions and data plane functions) for implementing a distributed data storage system for storing data to and accessing data from one or more persistent storage elements of the storage media nodes 170. In addition, the compute elements 152, 162 and 172 implement network interface functions to enable network communications over the communications network 190 (e.g., a CE communications network).

In another embodiment, the computing system 130 may be comprised of a plurality of virtual machines (VMs) that are implemented using a hypervisor, and which execute on one or more of the application server nodes 150, the network switch nodes 160, and/or the storage media nodes 170. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is an example of what is more generally referred to as "virtualization infrastructure." The hypervisor runs on physical infrastructure, e.g., CPUs and/or storage devices. An example of a commercially available hypervisor platform that may be used to implement portions of the computing system 130 in one or more embodiments of the invention is the VMware® vSphere™ which may have an associated virtual infrastructure management system such as the VMware® vCenter™. The underlying physical infrastructure may comprise one or more distributed processing platforms that include storage products such as VNX® and Symmetrix VMAX®, both commercially available from EMC Corporation (Hopkinton, Mass.).

Figure 2:
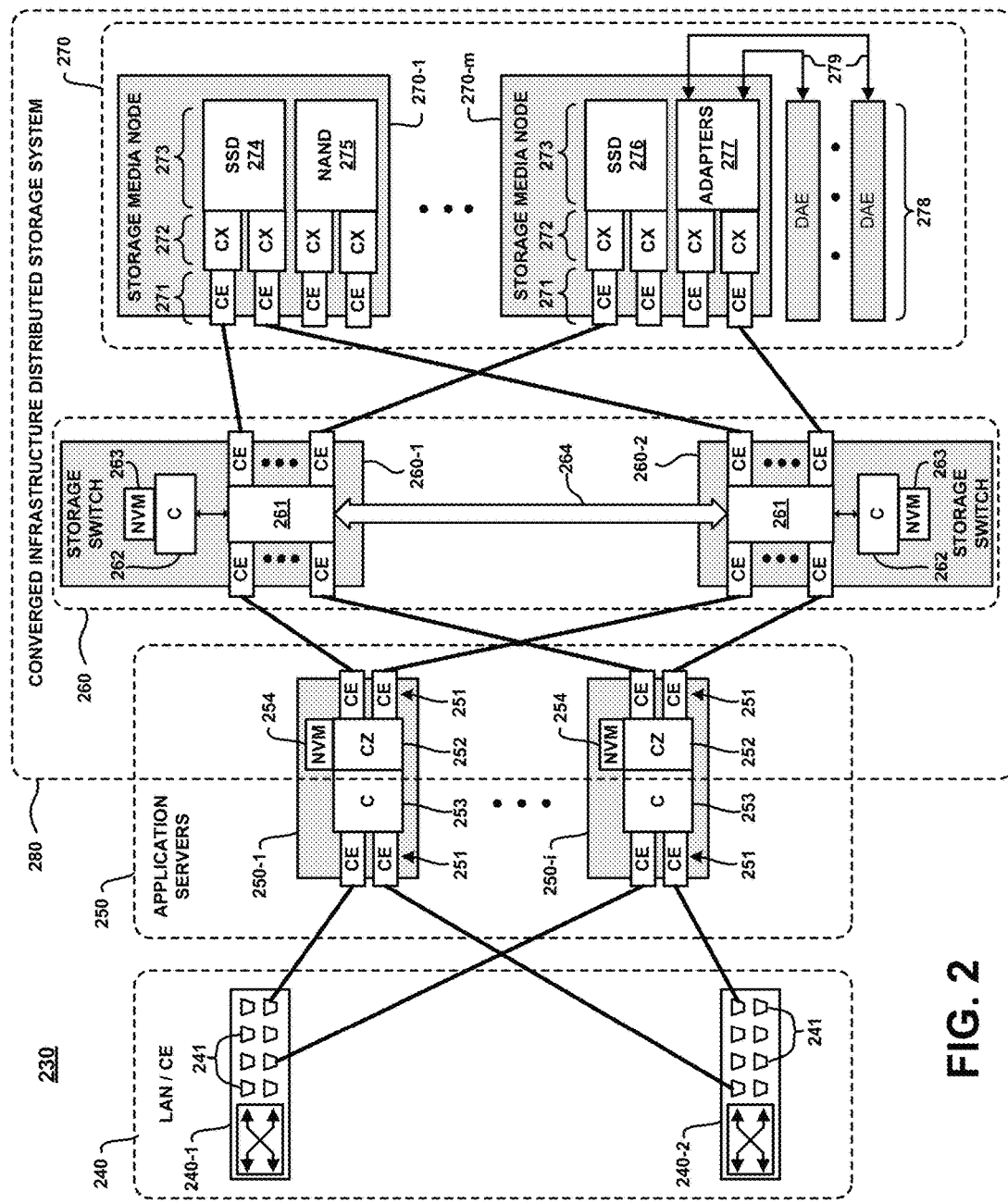
FIG. 2 schematically illustrates a computing system having a converged infrastructure that is implemented using distributed compute elements to provide a distributed storage system, according to an embodiment of the invention.

FIG. 2 schematically illustrates a computing system having a converged infrastructure that is implemented using distributed compute elements to provide a distributed storage system, according to an embodiment of the invention. More specifically, FIG. 2 schematically illustrates a computing system 230 having a framework that is based on the framework of the computing system 130 discussed above with reference to FIG. 1. As shown in FIG. 2, the computing system 230 comprises a front-end LAN 240, a cluster of application servers 250, storage network switches 260, and a cluster of storage media nodes 270.

The LAN 240 comprises a first switch 240-1 and a second switch 240-2, each having plurality of Ethernet ports 241. In one embodiment, the LAN 240 implements a CE communications network to enable client access to the cluster of application servers 250. The cluster of application servers 250 comprise a plurality of application server nodes 250-1, . . . , 250-$i$, wherein each application server node 250-1, . . . , 250-$i$ comprises a plurality of CE ports 251, a first compute element 252, a second compute element 253, non-volatile memory 254 (e.g., Flash memory), wherein the CE ports 251 are coupled to the first and second compute elements 252 and 253.

The storage network switches 260 comprise a first storage network switch 260-1 and a second storage network switch 260-2. The first and second storage network switches 260-1 and 260-2 each comprise switch circuitry 261, and a plurality of CE network ports coupled to the switch circuitry 261. The switch circuitry 261 is configured to implement a CE communications network to enable communication between the application servers 250 and the storage media nodes 270, and peer-to-peer communication between the storage media nodes 270. In addition, the first and second storage network switches 260-1 and 260-2 each comprise a compute element 262 and non-volatile memory 263. The first and second storage network switches 260-1 and 260-2 communicate with each other over one or more dedicated direct communication links 264 within a CE communications network implemented by the storage network switches 260.

The cluster of storage media nodes 270 comprises a plurality of storage media nodes 270-1, . . . , 270-$m$. The storage media nodes 270-1, . . . , 270-$m$ each comprise a plurality of CE ports 271, compute elements 272, and storage arrays 273. More specifically, in the example embodiment of FIG. 2, the storage arrays 273 of the storage media node 270-1 comprise an SSD storage array 274 and a NAND storage array 275. Further, the storage arrays 273 of the storage media node 270-$m$ comprise an SSD storage array 276, and a HDD array comprising a plurality of storage interface adapters 277 and associated DAEs (disk array enclosures) 278 which house a plurality of hard disk drives. In one embodiment of the invention, the storage interface adapters 277 implement one or more standard interfaces that enable the storage media node 270-$m$ to connect to and communicate with one or more direct attached storage nodes. For example, in one embodiment of the invention, the storage interface adapters 277 comprise PCIe-to-SAS host adapters, which enables the storage media node 270-*m* to be connected to one or more DAEs 278 using corresponding SAS connectors 279.

In the embodiment of FIG. 2, the application servers 250, the storage network switches 260, and the storage media nodes 270 are configured to implement an extensible converged infrastructure distributed storage system 280 ("CIDS") in which storage functions and network interface functions are distributed across the application servers 250, the storage network switches 260, and the storage media nodes 270. In particular, the extensible CIDS 280 is implemented by configuring the plurality of compute elements 252, 262, and 272, which reside on the respective application servers 250, storage network switches 260, and storage media nodes 270, to collaboratively control and coordinate (i) network interface functions for implementing a CE communications network and (ii) data storage functions such as RAID configuration, data placement, data encoding/decoding, and other data plane and control plane functions associated with data storage networking to configure the storage media nodes 270 as a pool of storage resources for persistent storage of data.

The compute elements 252, 262, and 272 are distributed across the CIDS 280, and may include workload-optimized processors, for example, which are optimized to handle functions such as a data and metadata processing, transferring and storing of data, and management and orchestration services for dynamic application workload placement, and other control and/or data plane processing. For example, in one embodiment of the invention, the compute elements 252 (which reside on the application servers 250) comprise workload-optimized compute elements with associated non-volatile memory 254, which are configured to support storage processing functions and network processing functions within the CIDS 280 environment on behalf of the application server nodes 250. In particular, while the compute elements 253 of the application server nodes 250 may comprise general purpose compute elements that are configured to execute applications that are associated with the service(s) supported by the computing system 230, the workload-optimized compute elements 252 of the application server nodes 250 are configured to implement data storage protocols, I/O protocols, caching protocols, etc., to support data storage and network-related processing within the CIDS 280 environment.

In one embodiment of the invention, the compute element 252, and associated non-volatile memory 254 and CE ports of a given application server node are integrated with a converged network adapter (CNA) to provide an intelligent CNA (referred to herein as "iCNA"). A converged network adapter is a computer input/output device that combines the functionality of a host bust adapter (HBA) with a network interface controller (NIC) to provide converged access to a SAN and an Ethernet computer network. In accordance with embodiments of the invention, an intelligent converged network adapter comprising a workload-optimized compute element 252 and integrated CE ports provides a data entry point and data exit point to and from the CIDS 280, and can be programmed to support storage processing functions and network processing functions within the CIDS 280 environment.

For example, each compute element 252 can execute an operating system (OS) which is separate from the OS executed by the general purpose compute elements 253 on the application server nodes 250. The compute elements 252 can present a first API (application programming interface) to the host application server nodes 250 which enables the host application server nodes 250 to offload CE network processing functions and storage processing functions (e.g., data hashing, erasure coding, data deduplication, data compression, data encryption, data placement, etc.) to the compute elements 252. In addition, the non-volatile memory 254 can be configured as a cache to support read/write cache management operations when data is stored to, or accessed from, one or more of the storage media nodes 270. The first API can enable programming of the server side compute element 252 to implement one or more of various storage interface protocols such as Block, File, Key-Value storage interfaces, etc.

In addition, the compute elements 252 can present a second (in-band) API to provide an interface to management and orchestration services implemented within the CIDS 280 environment (e.g., running on the storage switch nodes 260, for example). The second API for management and orchestration services allows new services (e.g., data deduplication, data compression, data encryption, etc.) to be implemented/configured by the compute elements 252 (residing on the iCNAs) in real-time, transparent to the host application server node, under control of the management and orchestration services of the CIDS 280.

The compute elements 262 of the storage network switches 260 may comprise general purpose or workload-optimized compute elements that are configured to (i) support CE switching functions implemented by the switch circuity 261, (ii) implement functions for generating and managing metadata which is used for handling scale-out aspects of the storage media nodes 270, and/or (iii) run management and orchestration services within the CIDS 280 environment. The non-volatile memories 263 can be configured to store metadata that is generated, managed, and processed by the compute elements 262. In addition, metadata is generated and processed by iCNAs of the application server nodes 250.

In general, the metadata comprises information about data that is stored in the storage media node 270. For example, the metadata can include information which (i) describes what the data is (e.g., describe the data content), (ii) specifies when and how the data was created, (iii) describes how the data is associated with other information or content, etc. Metadata can be complex and exist on many levels, e.g., metadata can provide information that describes a group of metadata, etc. By associating metadata with stored content, applications can store and access data in a more logical fashion. Moreover, stored data can be readily shared by creating metadata with access rights, which protects the stored data from unauthorized use. In addition, metadata allows multiple copies of data to be created (e.g. active, backup, and compliance copies) and provide information as to the locations of such copies. Further, metadata provides the ability to create workflows around stored content and share the stored content appropriately.

The metadata (scale-out information) can be readily shared and mirrored between the first and second storage network switches 260-1 and 260-2 over high-speed, low latency communication links 264 where fabric bandwidth is not an issue. The sharing and mirroring of metadata and other information within the CIDS 280 environment ensures data resiliency in the event of a failure. Moreover, the proximity of the metadata (in terms of bandwidth, latency, etc.) to the application servers nodes 250 and storage media nodes 270, etc., provides a readily accessible access point for services such as data backup, data replication, etc. Indeed, the storage and management of metadata in the storage network switches 260 provides an ideal location for analytical servers(s) to be attached and to receive data and metadata in a very efficient way, without disturbing/overloading the CIDS 280.

Furthermore, the compute elements 272 of the storage media nodes 270 comprise storage-side workload-optimized compute resources (CX) which are configured to implement network interface functions and memory controller functions. The network interface functions allow the storage media nodes 270 to communicate with the application servers 250 and other storage media nodes 270 through the CE communications network implemented by the storage switches 260. The memory controller functions implemented by the compute elements 272 enable the storage media nodes 270 to control and manage data access operations for storing and accessing data to and from persistent storage elements of the respective data storage arrays 273 using appropriate storage interfaces, depending on the type of non-volatile memory that is utilized by a given storage media node. The storage interfaces include, for example, a Flash NAND-based interface, an SSD-based interface, an HDD-based interface, and other standard or emerging NVM-based interfaces, or combinations of such interfaces to support a hybrid media solution. For example, one such interface may include NVMe (Non-volatile memory express), which in an interface that defines a command set and feature set for PCIe-based SSDs and NANDs, for example.

In addition, storage-side workload-optimized compute elements CX are further configured to implement storage processing functions including one or more of protocol termination, data compression, data cryptography, erasure coding, deduplication, data services such as data integrity checking, media management, FTL (flash translation layer) functions, and/or other local data plane and/or control plane functions. Other functions implemented by the compute elements 272 include, for example, hosting submission queues in local volatile and or non-volatile memory. Furthermore, for a Hadoop storage protocol, one or more compute elements 272 of the storage media nodes 270 can be configured to execute data plane/control plane functions including Hadoop Map Reduce functions to locally perform map tasks and reduce tasks on the given storage media node, and thereby, provide "near-data" processing when storing data to one or more of the storage media nodes 270.

The CIDS 280 framework of FIG. 2 provides a highly flexible scale-out enabled framework in which scaling of the application servers 250, the storage switches 260 and/or the storage media nodes 270 does not add any significant processing burden on other components within the CIDS 280 environment. For example, the addition of more application server nodes within the CIDS 280 environment does not add any significant processing burden on the storage switch nodes 260 (in terms of, e.g., metadata generation) or on the storage media nodes 270 (in terms of storage processing functions) as the addition of more application server nodes results in scaling of additional server-side workload-optimized compute elements 252, which can be configured to perform storage processing functions, etc., needed to support such scaling. Similarly, the scaling of the storage media nodes 270 results in the addition of storages-side workload-optimized compute elements 272, which can be configured to perform additional storage processing functions, etc., needed to support such scaling.

In addition, as noted above, the CIDS 280 implements an integrated management and orchestration service which, for example, enables (i) management of complex heterogeneous CIDS system elements and (ii) real-time service management to dynamically configure different services and functions that are executed across the compute elements 252, 262 and/or 270 within the CIDS 280 computing environment. For example, as noted above, in one embodiment of the invention, each of the compute elements 252, 262, and 272 executes an in-band API that allows the CIDS management and orchestration system to dynamically configure one or more of the compute elements 252, 262, and 272 to implement function(s) needed to support a newly provisioned service (e.g., transition from one service to another service) without disrupting the application server nodes 250. Moreover, the CIDS management and orchestration system facilitates application workload placement by identifying available CIDS components and providing configuration commands to provision groups of such components in preparation for application deployment.

In one embodiment of the invention, the compute elements 262 of the storage switches 260 can be configured to execute functions to implement the CIDS management and orchestration system. In this embodiment, the CIDS management and orchestration system executing on the compute elements 262 of the storage switches 260 can communicate (via the CE communications network) with other compute elements 252/272 on the application server nodes 250 and storage media nodes 270 to configure such compute elements 252/272 via the in-band API executing on the compute elements 252/272. In another embodiment of the invention, the control functions of the CIDS management and orchestration system can be distributed over one or more of any combination of the compute elements 252, 262 and/or 272 of the CIDS 280, wherein any part of the CIDS architecture (C, CX, or CZ) can serve as an access point for the CIDS management and orchestration system. In yet another embodiment of the invention, storage node or server node may serve as a primary access point for the CIDS management and orchestration system.

The CIDS framework of FIG. 2 enables the application of a distributed QoS (quality of service) to be implemented over the distributed compute elements 252, 262, and 272 of the application servers 250, storage switches 260, and storage media nodes 270. Indeed, the CIDS management and orchestration system can be configured to define performance metrics such as latency, IOPS (Input/Output Operations Per Second), and other performance measurements, etc., which are used to benchmark performance of the various components of the CIDS 280 environment (e.g., HDDs, SSD, SAN, etc.).

Figure 3:
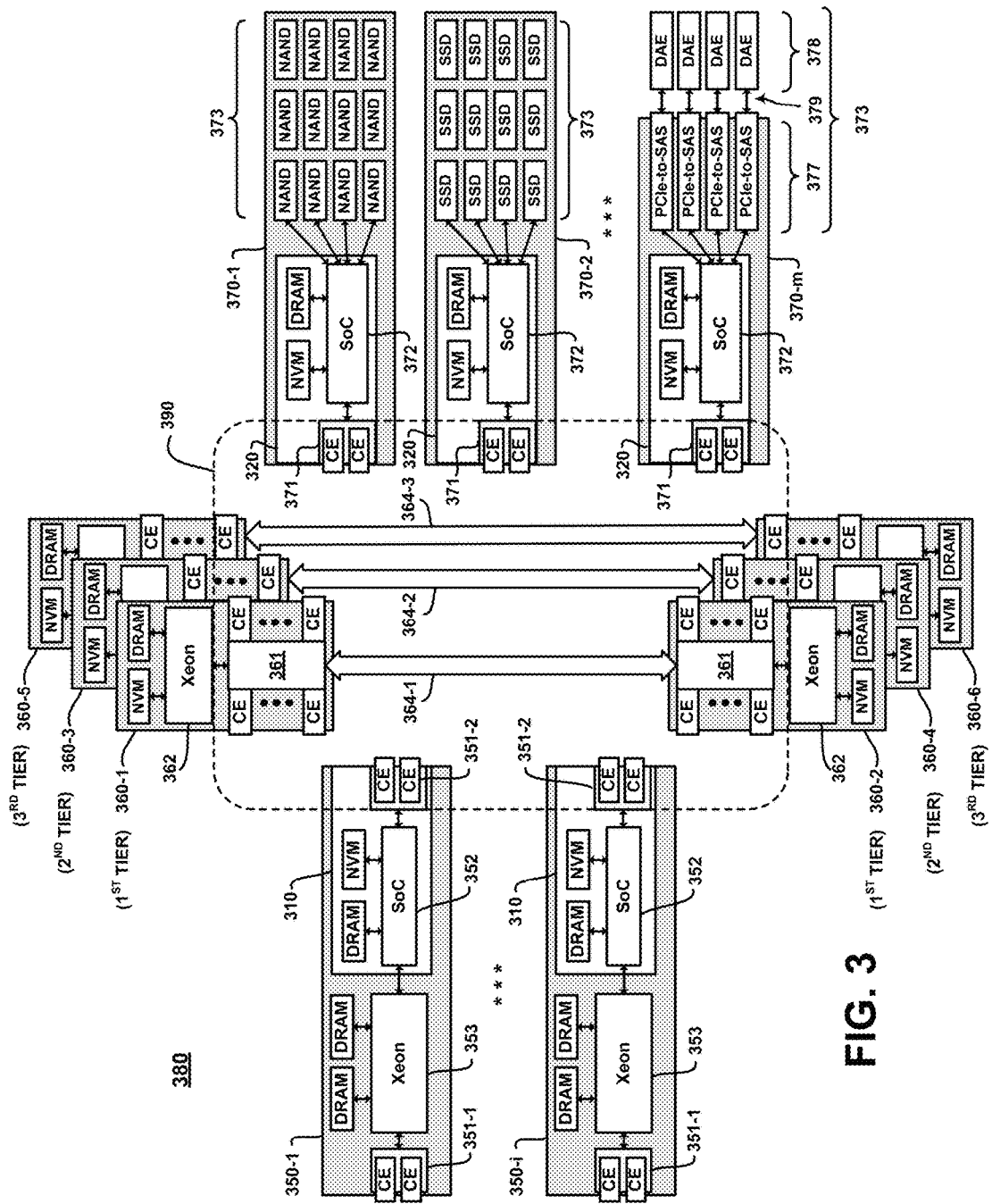
FIG. 3 schematically illustrates a specific implementation of a computing system that is based on the architecture of FIG. 2, according to an embodiment of the invention.

FIG. 3 schematically illustrates a specific implementation of a computing system that is based on the architecture of FIG. 2, according to an embodiment of the invention. In particular, FIG. 3 illustrates a CIDS environment 380 according to an embodiment of the invention, wherein specific implementations are shown for the compute elements (CZ, C, CX) of the application servers, the storage switches, and the storage media nodes shown in FIG. 2. In particular, FIG. 3 schematically illustrates application server nodes 350-1, . . . , 350-i (collectively referred to as application servers 350), storage network switches 360-1, 360-2, 360-3, 360-4, 360-5, and 360-6 (collectively referred to as storage network switches 360), and storage media nodes 370-1, 370-2, . . . , 370-m (collectively referred to as storage media nodes 370).

The application server nodes 350 each comprise CE network interface circuitry 351-1, a microprocessor 353, and an iCNA 310. The microprocessor 353 is coupled to one or more volatile memories (DRAM). The iCNA comprises an SoC (System on Chip) 352, CE network interface circuitry 351-2, volatile memory (DRAM), and non-volatile memory (NVM) coupled to the SoC 352. As shown in the example embodiment of FIG. 3, the microprocessor 353 can be implemented using an XEON® brand microprocessor, although other types of general purpose or workload optimized hardware processors may be implemented. The non-volatile memory (NVM) can be implemented using Flash NAND storage. The microprocessor 353 executes one or more applications supported by the given application server node, and implements functions for interfacing with and/or controlling the CE network interface circuitry 351-1.

In addition, the SoCs 352 include integrated circuitry to implement server-side compute elements (CZ) within the CIDS environment 380. The SoCs 352 implement the data storage processing and network interface functions of the compute elements CZ as discussed above with reference to FIGS. 1 and 2. For example, as discussed above, the iCNA 310 with the workload-optimized compute element (SoC 352) (along with the integrated volatile memory (DRAM), non-volatile memory (NVM), and CE network interface circuitry 351-2) provides CIDS data-entry/exit point, executes a native operating system, and presents an API to the host application server node to offload storage and network-related processing functions from the application server node. The CE network interface circuitry 351-2 of the iCNA 310 enables access the CE communications network 390 implemented within the CIDS environment 380.

The storage network switches 360 each comprise switch circuity 361, a microprocessor 362, and volatile memory (DRAM) and non-volatile memory (NVM) coupled to the microprocessor 362. As shown in the example embodiment of FIG. 3, the microprocessors 353 can be implemented using an XEON® brand microprocessor, although other types of general purpose or workload optimized hardware processors may be implemented. The non-volatile memory (NVM) can be implemented using Flash NAND storage. The microprocessors 362 implement data storage processing and network interface functions within the CIDS environment 380, which are the same or similar to the functions implemented by the compute elements C (elements 152, 252) as discussed above with reference to FIGS. 1 and 2.

In the embodiment of FIG. 3, the storage network switches 360-1 and 360-2 may be considered "top of the rack switches" which are included in the same system rack as the application server nodes 350 and the associated storage media nodes 370 shown in FIG. 3. The example embodiment of FIG. 3 schematically illustrates a method for storage switch scaling, wherein the storage network switch 360-1 can be coupled to additional storage network switches 360-3 and 360-5 that reside in other system racks, and wherein the storage network switch 360-2 can be coupled to additional storage network switches 360-4 and 360-6 that reside in the other system racks. In this embodiment, rack-to-rack communication between storage switches can be implemented under control of the switch circuity 361 of the various storage network switches 360 to provide high-bandwidth CE communication links between top of the rack switches in different system racks. This allows the storage switch functions (e.g., metadata management, CIDS management and orchestration, etc.) to be distributed over additional network switches that may reside in other system racks. This also enables a separate CIDS environments executing in different systems racks to be coupled together to create a larger, more powerful CIDS environment (as compared to scaling the application servers and/or storage media nodes within a single system rack).

Moreover, the storage network switches 360-1 and 360-2 can be considered to be part of a "first tier" within the CIDS environment 380, which are connected via high-bandwidth communication links 364-1 (in a first rack) in the CE communications network 390. In addition, the storage network switches 360-3 and 360-4 can be considered to be part of a "second tier" within the CIDS environment 380, which are connected via high-bandwidth communication links 364-2 (in a second rack) in the CE communications network 390. Further, the storage network switches 360-5 and 360-6 can be considered to be part of a "third tier" within the CIDS environment 380, which are connected via high-bandwidth communication links 364-3 (in a third rack) in the CE communications network 390. As explained in further detail below, scaling of the network switches in this manner (different tiers) enable different services and scale out solutions to accommodate different QoS requirements for different tiers within the CIDS environment 380.

As further shown in FIG. 3, each storage media node 370 comprise a compute node 320 and a data storage array 373. Each compute node 320 comprises CE network interface circuitry 371, an SoC 372, and volatile memory (DRAM), and non-volatile memory (NVM) coupled to the SoC 372. The non-volatile memory (NVM) can be implemented using Flash NAND storage. The SoCs 372 include integrated circuitry to implement the storage-side data storage processing and network interface functions of the compute elements CX as discussed above with reference to FIGS. 1 and 2, for example. In the example embodiment of FIG. 3, the storage media node 370-1 comprises Flash NAND storage arrays, wherein the SoC 372 of the storage media node 370-1 would be configured with storage interface functions to access and manage the NAND storage arrays. The storage media node 370-2 comprises SSD storage arrays, wherein the SoC 372 of the storage media node 370-2 would be configured with storage interface functions to access and manage the SSD storage arrays. Moreover, the storage media node 370-m comprises a plurality of PCIe-to-SAS adapters 377 that are coupled to respective DAEs 378 (having HDD drives) via respective SAS cables 379, wherein the storage media node 370-m would be configured with storage interface functions (e.g., PCIe controller) to access and manage HDDs within the DAEs via the adapters 377.

Figure 4:
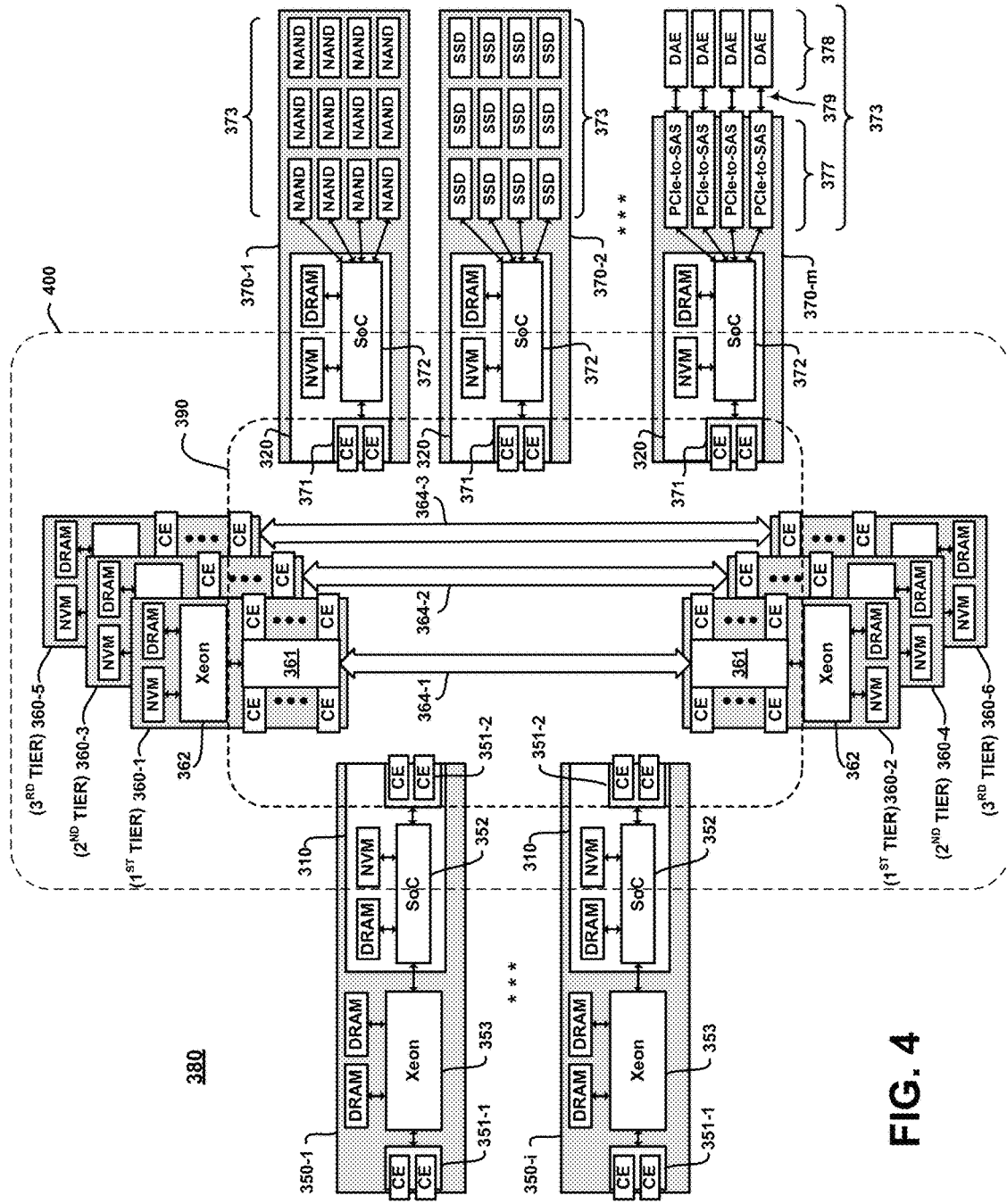
FIG. 4 schematically illustrates a method for implementing a first level tier of storage based on the converged infrastructure computing framework of FIG. 3, according to an embodiment of the invention.

FIG. 4 schematically illustrates a method for implementing a first level tier of storage based on the converged infrastructure computing framework of FIG. 3, according to an embodiment of the invention. In particular, FIG. 4 schematically illustrates a method for implementing a first level tier of non-volatile storage (denoted by dashed line 400) within the CIDS environment 380 using the non-volatile memories (NVM) of the iCNAs 310 of the application servers 350, the storage network switches 360, and the storage media nodes 370 within the same system rack. It is to be understood that the additional (lower level) tiers of non-volatile storage can be implemented using the non-volatile memories (NVM) of storage switches/application servers/storage media nodes that reside in or are otherwise associated with other system racks. For instance, assuming that the storage network switches 360-3 and 360-4 reside in a separate rack, the non-volatile memories (NVM) of the storage network switches 360-3 and 360-4 can be deemed part of a second level tier of non-volatile storage. The different tiers of NVM memory can be defined based on access latency, wherein it may be assumed, for example, that access to CIDS components in other system racks provides increased latency.

Similarly, in the embodiment of FIG. 4, the dashed line 400 may represent a first level tier workload-optimized compute layer within the CIDS environment 380. The first level tier workload-optimized compute layer 400 and other lower level tiers are implemented around the network (fabric) to enable different services and scale out solutions with different QoS requirements, for example.

Figure 5:
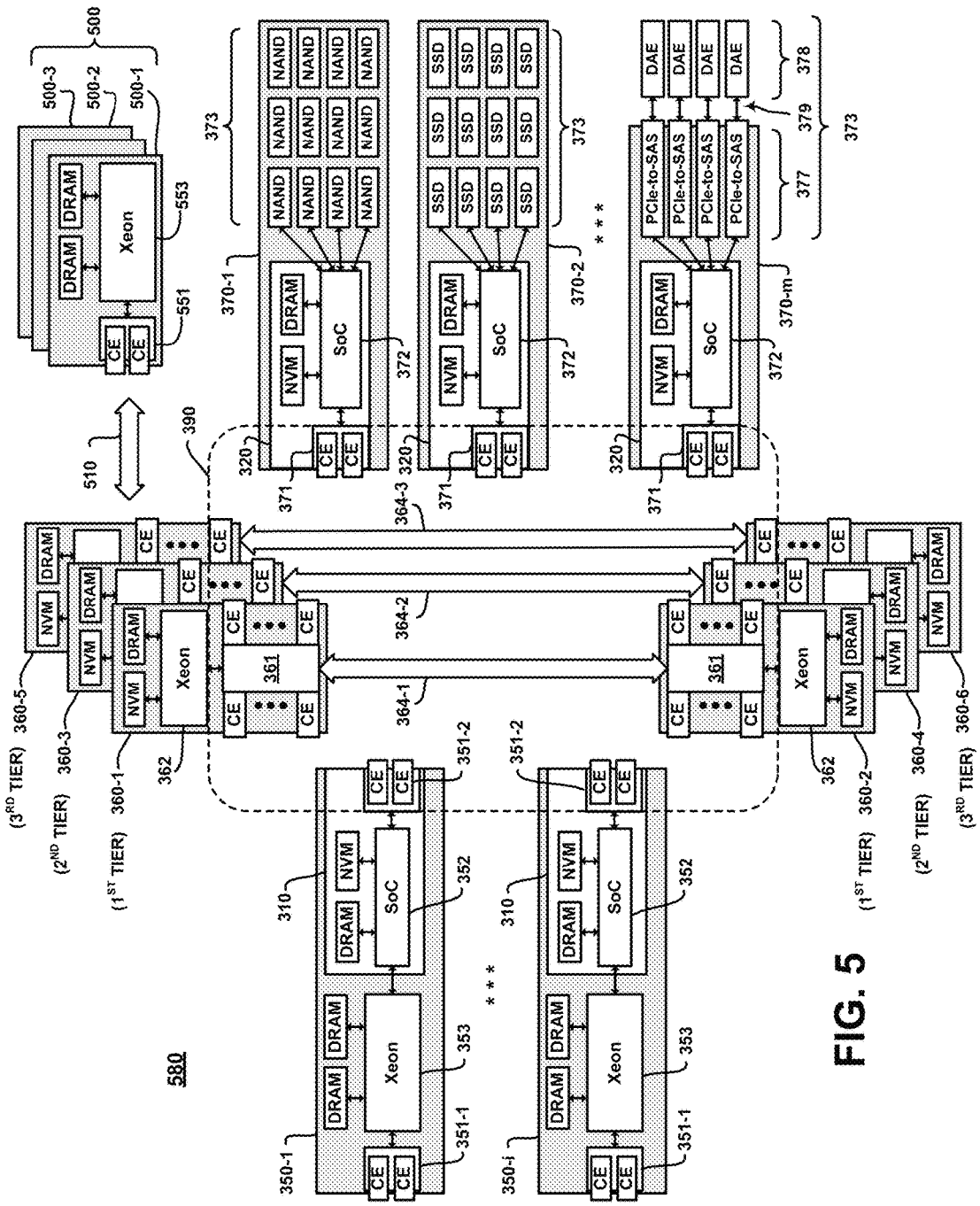
FIG. 5 schematically illustrates a computing system having a converged infrastructure that is implemented using distributed compute elements, according to another embodiment of the invention.

FIG. 5 schematically illustrates a computing system having a converged infrastructure that is implemented using distributed compute elements, according to another embodiment of the invention. More specifically, FIG. 5 schematically illustrates a CIDS environment 580 which is similar to the CIDS environment shown in FIGS. 3 and 4, but wherein the CIDS environment 580 in FIG. 5 comprises a CIDS management and orchestration system 500 that is implemented using one or more separate server nodes, e.g., server nodes 500-1, 500-2, and 500-3 as shown in the example embodiment. The server nodes 500-1, 500-2, and 500-3 communicate with the storage network switches 360 over CE network links 510. Each server node 500-1, 500-2, and 500-3 comprises CE network interface circuitry 551, a microprocessor 553, and one or more volatile memories (DRAM) coupled to the microprocessor 553. As shown in the example embodiment of FIG. 5, the microprocessor 553 can be implemented using an XEON® brand microprocessor, although other types of general purpose or workload optimized hardware processors may be implemented.

The microprocessors 353 of the CIDS management and orchestration system 500 nodes execute functions to (i) support CE networking functions implemented by the CE network interface circuitry 551, (ii) implement functions for generating and managing metadata which is used for handling scale-out aspects of the storage media nodes 370, and (iii) run management and orchestration services for the CIDS environment 380, as discussed above. The metadata that is generated by the CIDS management and orchestration system 500 nodes can be stored in the non-volatile memories (NVM) of the storage network switches 360 for low-latency access by compute elements within the CIDS environment 380. The server nodes 500-1, 500-2, and 500-3 may reside on the same system rack, or distribute across different system racks. In the embodiment of FIG. 5, the server nodes 500-1, 500-2, and 500-3 provide a primary access point for the CIDS management and orchestration services.

Figure 6:
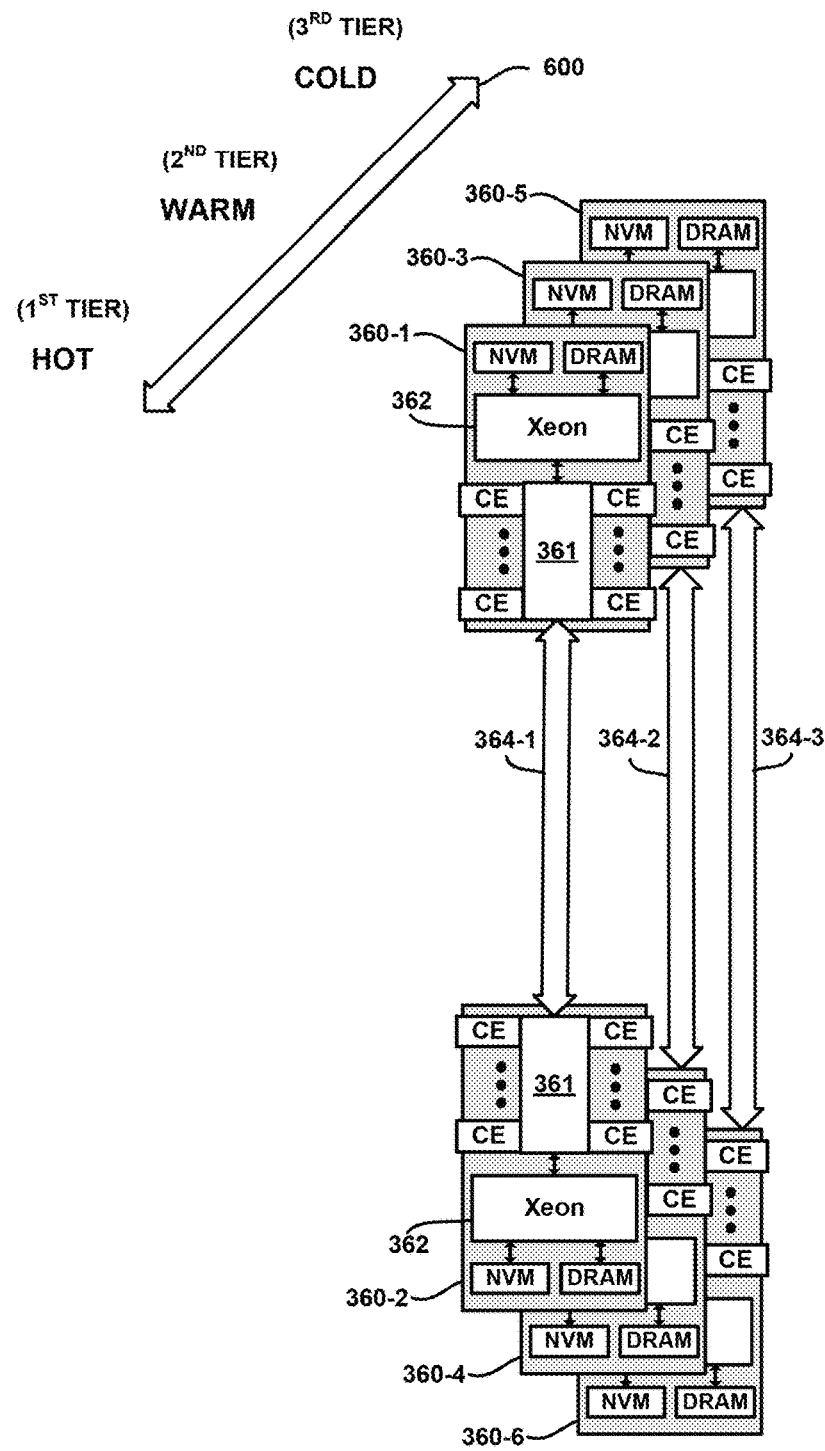
FIG. 6 schematically illustrates a method for providing different level tiers of backend data storage in a computing system having a converged infrastructure that is implemented using distributed compute elements, according to an embodiment of the invention.

FIG. 6 schematically illustrates a method for providing different level tiers of backend data storage in a computing system having a converged infrastructure that is implemented using distributed compute elements, according to an embodiment of the invention. More specifically, FIG. 6 illustrates a method for assigning different temperatures 600 to data to allow the CIDS environment to be data-aware and storing different types of data and content in different storage tiers according to QoS requirements, for example. For example, as discussed above with reference to FIG. 3, the storage network switches 360-1 and 360-2 shown in FIG. 6 can be considered to be part of a "first tier" within the CIDS environment 380, the storage network switches 360-3 and 360-4 can be considered to be part of a "second tier" within the CIDS environment 380, and the storage network switches 360-5 and 360-6 can be considered to be part of a "third tier" within the CIDS environment 380.

The CIDS management and orchestration system can be configured to dynamically allocate and schedule resources within the different tiers and assign QoS status to different types of data that is stored, and different types of services provided, within the various tiers of the CIDS environment. For example, a first level tier within the CIDS environment may provide the lowest latency with respect to data storage access time (e.g., assigned HOT status), whereas lower level tiers (e.g., second and third level tiers) within the CIDS environment may provide the higher latency with respect to data storage access time (e.g., assigned a WARM or COLD status). In this regard, certain types of stored data that are frequently accessed and/or require low latency access can be stored in a first level tier in which storage media nodes implement high speed Flash NAND technology, for example. In addition, certain types of stored data that are not frequently accessed or require large storage capacity can be stored in a lower level tier in which the storage media nodes are implemented using HDD storage technology, for example.

Similarly, different application servers or other compute nodes that reside within different tiers of the CIDS environment can have different computing capabilities (e.g., general purpose processors as compared to workload optimized processors such as hardware accelerators). The different computing capabilities can be used as a basis to assign QoS status to different types of data processing services that are within the various tiers of the CIDS environment. Various networking features such as the Virtual Extensible LAN (VXLAN) standard and QoS protocols can be implemented to route data to different tiers within the CIDS environment for storage, data processing, and/or workload placement depending on the QoS status and other status information.

Figure 7:
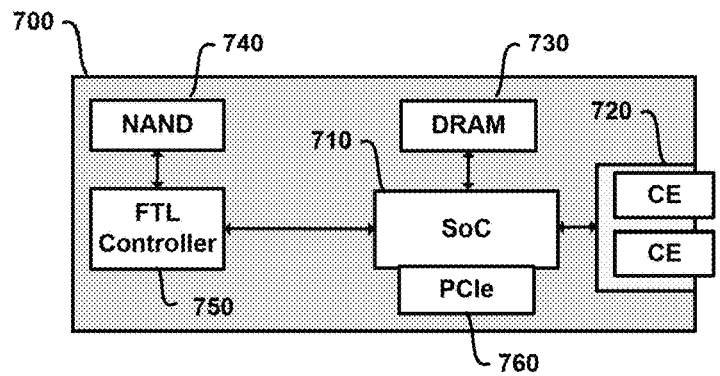
FIG. 7 schematically illustrates a converged network adapter that can be used to implement a converged infrastructure computing system, according to an embodiment of the invention.

FIG. 7 schematically illustrates a converged network adapter that can be used to implement a converged infrastructure computing system, according to an embodiment of the invention. More specifically, FIG. 7 schematically illustrates another embodiment of an iCNA 700 which can be implemented in an application server node of a CIDS environment. The iCNA 700 comprises an SoC 710, CE network interface circuitry 720, volatile memory 730 (e.g., DRAM), non-volatile memory 740 (e.g., NAND), an FTL controller 750, and a PCIe interface 760. The FTL controller 750 implements functions that allows the OS of the SoC 710 to read and write to the Flash-based NAND storage 740 by translating block level calls to disk from a file system of the OS to an internal addressing scheme of the flash NAND 740. The PCIe interface 760 provides an interface that enables the SoC 710 to communicate with other compute elements residing on the application server node.

Figure 8:
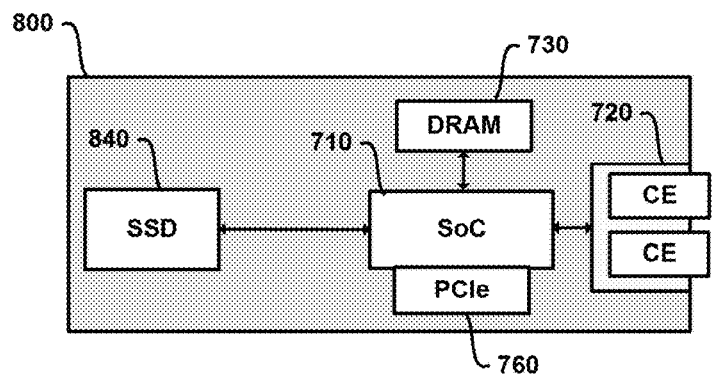
FIG. 8 schematically illustrates a converged network adapter that can be used to implement a converged infrastructure computing system, according to another embodiment of the invention.

FIG. 8 schematically illustrates a converged network adapter that can be used to implement a converged infrastructure computing system, according to another embodiment of the invention. In particular, FIG. 8 schematically illustrates another embodiment of an iCNA 800 which can be implemented in an application server node of a CIDS environment. The iCNA 800 is similar to the iCNA 700 of FIG. 7, expect that the iCNA 800 implements an SSD 840 for local non-volatile storage.

Figure 9:
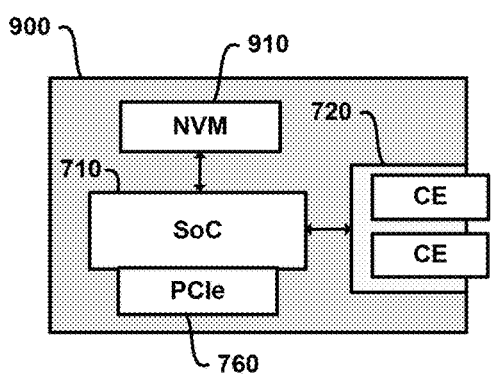
FIG. 9 schematically illustrates a converged network adapter that can be used to implement a converged infrastructure computing system, according to yet another embodiment of the invention.

FIG. 9 schematically illustrates a converged network adapter that can be used to implement a converged infrastructure computing system, according to yet another embodiment of the invention. In particular, FIG. 9 schematically illustrates another embodiment of an iCNA 900 which can be implemented in an application server node of a CIDS environment. The iCNA 900 is similar to the iCNAs of FIGS. 7 and 8, expect that the iCNA 900 comprises a non-volatile memory 910 that is implemented using some current or future state of the art NVM technology that provides a combination of fast access performance of DRAM technology with the scaling performance of NAND technology. The iCNA 900 eliminates the need for expensive DRAM memory.

In the embodiments of FIGS. 7, 8 and 9, the SoC 710 can be implemented using an ARM-based system-on-chip architecture. The SoC 710 executes a separate OS with virtualized functions to implement various data storage processing and network interface functions as discussed above. For example, the SoC exposes a system API to the application server node to implement one or more of block, file, and/or object storage protocols, for example. The storage processing functions include READ and WRITE cache support function, wherein caching is managed in hardware. For WRITE-based data storage processing, the SoC 710 supports functions such as hash, compression, encryption, erasure coding, data placement, etc. For READ-based data processing functions, the SoC 710 is configured to re-assembles data from minimum required number of data segments, which compensates for non-uniform latency across the CE communications network. In addition, the SoC 710 implements functions to support multi-dimensional RAID across the CE communications network, e.g., across NAND—Flash Modules—storage media nodes, storage switches/racks, etc.

Figure 10:
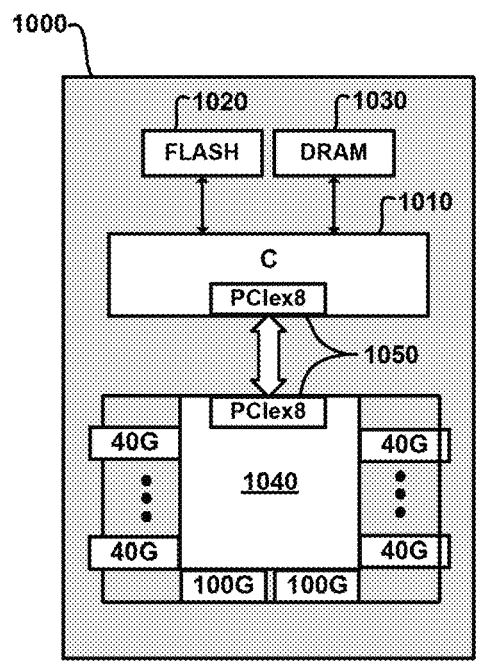
FIG. 10 schematically illustrates a network switch node that can be used to implement a converged infrastructure computing system, according to an embodiment of the invention.

FIG. 10 schematically illustrates a network switch node that can be used to implement a converged infrastructure computing system, according to an embodiment of the invention. More specifically, FIG. 10 schematically illustrates an embodiment of a storage switch 1000 comprising a microprocessor 1010, non-volatile memory 1020 (e.g., Flash memory) and volatile memory 1020 (e.g., DRAM) coupled to the microprocessor 1010, and an IC chip 1040 comprising CE switching circuitry and CE ports. The microprocessor 1010 and IC chip 1040 comprise corresponding interfaces 1050 that enable microprocessor 1010 and IC chip 1040 to communicate using a known interface standard such as PCIe. The IC chip 1040 comprises CE switching circuitry that provides, e.g., 40 Gigabit CE communication between application server nodes and storage media nodes over CE network, and 100 Gigabit CE communication over dedicated links between storage switches to process/share metadata and scale-out related load. The microprocessor 1010 is configured to implement functions to support data center bridging, priority-based flow control, QoS, guaranteed delivery, other network related functions, etc. The local non-volatile memory 1020 is utilized, for example to store WRITE data if mirroring is implemented.

Figure 11:
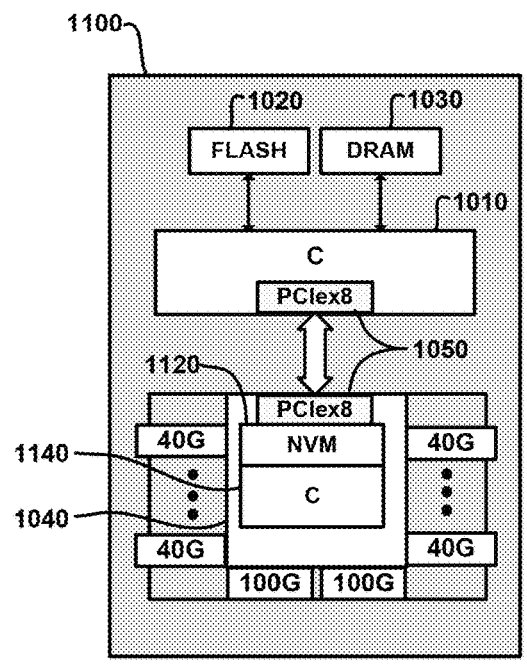
FIG. 11 schematically illustrates a network switch node that can be used to implement a converged infrastructure computing system, according to another embodiment of the invention.

FIG. 11 schematically illustrates a network switch node that can be used to implement a converged infrastructure computing system, according to another embodiment of the invention. More specifically, FIG. 11 schematically illustrates another embodiment of a storage switch 1100 which is similar to the storage switch 1000 of FIG. 10, except that the IC chip 1040 further comprises integrated processor circuity 1140 and an integrated local non-volatile memory 1120, which allows additional intelligence to be incorporated into the switching circuity of the IC chip 1040. The integrated processor 1140 may comprise a workload-optimized processor, such as one or more hardware accelerators, to more efficiently execute data storage and network related processing functions on the storage switch 1100 as desired, depending on the application.

Figure 12:
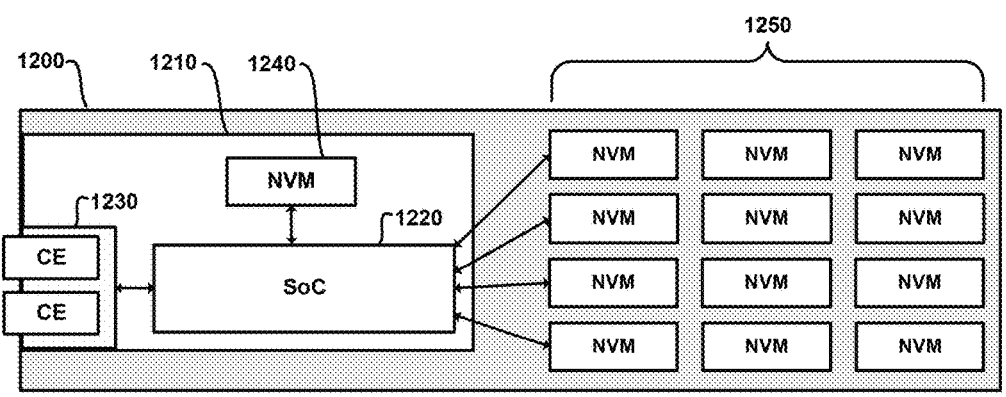
FIG. 12 schematically illustrates a storage media node that can be used to implement a converged infrastructure computing system, according to an embodiment of the invention.

FIG. 12 schematically illustrates a storage media node that can be used to implement a converged infrastructure computing system, according to an embodiment of the invention. More specifically, FIG. 12 schematically illustrates a storage media node 1200 which comprises a compute node 1210 and a data storage array 1250 of non-volatile storage elements. The compute node 1210 comprises an SoC 1220, CE switch circuitry 1230, and a non-volatile memory 1240 coupled to the SoC 1220. In one embodiment of the invention, the non-volatile memory 1240 is implemented using a current or future state of the art NVM technology that provides a combination of fast access performance of DRAM technology with the scaling performance of NAND technology, which eliminates the need for implanting expensive DRAM memory, for example, on the storage media node 1200. The data storage array 1250 of non-volatile storage elements can be implemented using one or more different types of storage media such as NAND, SSD, HDD, etc. The SoC 1220 implements local network interface and data storage processing functions such as described above.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computing system, comprising:
a converged infrastructure comprising:
a plurality of application server nodes;
a plurality of storage media nodes, wherein each storage media node comprises a plurality of persistent storage elements to store data; and
a plurality of network switch nodes configured to enable communication between the application server nodes and the storage media nodes, and to enable communication between the storage media nodes;
wherein the converged infrastructure comprises a plurality of compute elements which are distributed over and which reside on the application server nodes, the network switch nodes, and the storage media nodes, wherein the compute elements comprise processor devices; and
wherein the distributed compute elements residing on the application server nodes, the network switch nodes, and the storage media nodes are configured to collaboratively control and coordinate (i) network interface functions for implementing a converged communications network and (ii) data plane functions and control plane functions associated with data storage functions for implementing a distributed data storage system for storing data to and accessing data from one or more persistent storage elements of the storage media nodes, within the converged infrastructure;
wherein at least one network switch node comprises a dedicated processor device that is configured to perform data storage functions for storing data to and accessing data from the persistent storage elements of the storage media nodes, wherein the data storage functions performed by the dedicated processor device comprise generating and managing metadata with regard to data that is stored in the storage media nodes, wherein the metadata is utilized by the distributed compute elements to perform the data storage functions and enable extensible scaling of the distributed data storage system within the converged infrastructure.

2. The computing system of claim 1, wherein the distributed compute elements comprise workload optimized hardware processors.

3. The computing system of claim 1, wherein each application server node comprises a converged network adapter which provides a data entry point and data exit point to and from the converged infrastructure, wherein the network adapter comprises a workload-optimized compute element and a plurality of network ports, wherein the workload-optimized compute element is configured to support storage processing functions and network processing functions within the converged infrastructure on behalf of the application server node.

4. The computing system of claim 3, wherein the converged network adapter comprises non-volatile memory that is configured as a cache to support data read operations and data write operations when data is stored to, or accessed from, one or more of the storage media nodes.

5. The computing system of claim 1, wherein each network switch node comprises:
switch circuitry, and a plurality of network ports coupled to the switch circuitry, wherein the switch circuitry is configured to implement a converged Ethernet communications network to enable communication between the application server nodes and the storage media nodes, and communication between the storage media nodes;
a dedicated processor device configured to implement storage processing functions within the converged infrastructure.

6. The computing system of claim 5, wherein the dedicated processor device of each network switch node is configured to generate and manage at least a portion of the metadata which is utilized by the distributed compute elements to perform the data storage functions and enable the extensible scaling of the distributed data storage system within the converged infrastructure.

7. The computing system of claim 6, wherein each network switch node further comprises non-volatile memory to store the metadata, and wherein the network switch nodes communicate with each other over dedicated direct communication links within the converged Ethernet communications network to share and mirror the metadata across the network switch nodes to enable the extensible scaling of the distributed data storage system within the converged infrastructure.

8. The computing system of claim 1, wherein the distributed compute elements on the storage media nodes comprise storage-side workload-optimized processors which are configured to implement network interface functions and memory controller functions, wherein the network interface functions allow the storage media nodes to communicate with the application servers and other storage media nodes, and wherein the memory controller functions enable the storage media nodes to control and manage data access operations for storing and accessing data to and from the persistent storage elements of the storage media nodes.

9. The computing system of claim 8, wherein the storage-side workload-optimized processors of the storage media nodes are further configured to implement functions including one or more of protocol termination, data integrity checking, data compression, data cryptography, erasure coding, deduplication, and local data processing.

10. The computing system of claim 1, wherein at least a portion of the distributed compute elements are configured to implement a management and orchestration service.

11. The computing system of claim 10, wherein the distributed compute elements of the network switch nodes are configured to implement the management and orchestration service, and wherein the distributed compute elements of the application server nodes, the network switch nodes, and the storage media nodes are configured to implement an in-band API (application programming interface) that allows the management and orchestration service to dynamically reconfigure the distributed compute elements of the application server nodes, the network switch nodes, and the storage media nodes to implement different functions depending on changes in workload or changes in application services within the converged infrastructure.

12. The computing system of claim 1, further comprising at least one server node that is configured to implement a management and orchestration service, wherein the at least one server node is network connected to the network switch nodes, which serve as an access point by the at least one server node to implement management and orchestration service functions within the converged infrastructure.

13. A data center comprising the computing system of claim 1.

14. A method, comprising:
configuring a plurality of application server nodes, a plurality of storage media nodes, and a plurality of network switch nodes to implement a converged infrastructure, wherein each storage media node comprises a plurality of persistent storage elements to store data, and wherein the network switch nodes are configured to enable communication between the application server nodes and the storage media nodes, and to enable communication between the storage media nodes; and
configuring a plurality of compute elements which are distributed over and which reside on the application server nodes, the network switch nodes, and the storage media nodes, to collaboratively control and coordinate (i) network interface functions for implementing a converged communications network and (ii) data plane functions and control plane functions associated with data storage functions for implementing a distributed data storage system for storing data to and accessing data from one or more persistent storage elements of the storage media nodes, within the converged infrastructure, wherein the compute elements comprise processor devices;
wherein at least one network switch node comprises a dedicated processor device that is configured to perform data storage functions for storing data to and accessing data from the persistent storage elements of the storage media nodes, wherein the data storage functions performed by the dedicated processor device comprise generating and managing metadata with regard to data that is stored in the storage media nodes, wherein the metadata is utilized by the distributed compute elements to perform the data storage functions and enable extensible scaling of the distributed data storage system within the converged infrastructure.

15. The method of claim 14, wherein the distributed compute elements comprise workload optimized hardware processors.

16. The method of claim 14, wherein configuring the plurality of compute elements comprises configuring a work-load optimized compute element of a converged network adapter, which resides on an application server node, to perform storage processing functions and network processing functions within the converged infrastructure on behalf of the application server node.

17. The method of claim 14, wherein configuring the plurality of compute elements comprises configuring dedicated processor devices of the network switch nodes to (i) generate and manage the metadata which is utilized by the distributed compute elements to perform the data storage functions and enable the extensible scaling of the distributed data storage system within the converged infrastructure, and to (ii) share the metadata between the network switch nodes over dedicated direct communication links between the network switch nodes.

18. The method of claim 14, wherein configuring the plurality of compute elements comprises configuring storage-side workload-optimized compute elements, which reside on the storage nodes, to implement network interface functions and memory controller functions, wherein network interface functions allow the storage media nodes to communicate with the application servers and other storage media nodes, and wherein the memory controller functions enable the storage media nodes to control and manage the data access operations for storing and accessing data to and from the persistent storage elements of the storage media nodes.

19. An article of manufacture comprising a non-transitory processor-readable storage medium having stored therein software instructions, which are executable by one or more hardware processor devices to:

configure a plurality of application server nodes, a plurality of storage media nodes, and a plurality of network switch nodes to implement a converged infrastructure, wherein each storage media node comprises a plurality of persistent storage elements to store data, and wherein the network switch nodes are configured to enable communication between the application server nodes and the storage media nodes, and to enable communication between the storage media nodes; and configuring a plurality of compute elements which are distributed over and which reside on the application server nodes, the network switch nodes, and the storage media nodes, to collaboratively control and coordinate (i) network interface functions for implementing a converged communications network and (ii) data plane functions and control plane functions associated with data storage functions for implementing a distributed data storage system for storing data to and accessing data from one or more persistent storage elements of the storage media nodes, within the converged infrastructure, wherein the compute elements comprise processor devices;

wherein at least one network switch node comprises a dedicated processor device that is configured to perform data storage functions for storing data to and accessing data from the persistent storage elements of the storage media nodes, wherein the data storage functions performed by the dedicated processor device comprise generating and managing metadata with regard to data that is stored in the storage media nodes, wherein the metadata is utilized by the distributed compute elements to perform the data storage functions and enable extensible scaling of the distributed data storage system within the converged infrastructure.

20. The article of manufacture of claim 19, wherein the distributed compute elements comprise workload optimized hardware processors.

* * * * *